(12) United States Patent
Satish et al.

(10) Patent No.: US 10,936,716 B1
(45) Date of Patent: Mar. 2, 2021

(54) INCIDENT HANDLING ASSISTANCE BASED ON PREVIOUS INCIDENT HANDLING

(71) Applicant: Splunk Inc., San Francisco, CA (US)

(72) Inventors: Sourabh Satish, Freemont, CA (US); Trenton John Beals, Hayward, CA (US); Glenn Gallien, San Francisco, CA (US); Govind Salinas, Sunnyvale, CA (US)

(73) Assignee: Splunk Inc., San Erancisco, CA (US)

( * ) Notice: Subject to any disclaimer, the term of this patent is extended or adjusted under 35 U.S.C. 154(b) by 144 days.

(21) Appl. No.: 16/051,278

(22) Filed: Jul. 31, 2018

(51) Int. Cl.
| | |
|---|---|
| G06F 21/55 | (2013.01) |
| H04L 29/06 | (2006.01) |
| G06F 9/451 | (2018.01) |
| G06F 11/07 | (2006.01) |
| H04L 12/24 | (2006.01) |
| G06F 11/34 | (2006.01) |

(52) U.S. Cl.
CPC ............ *G06F 21/554* (2013.01); *G06F 9/453* (2018.02); *G06F 11/0793* (2013.01); *G06F 11/3438* (2013.01); *H04L 41/0631* (2013.01); *H04L 63/1416* (2013.01); *H04L 63/1425* (2013.01); *H04L 63/1441* (2013.01)

(58) Field of Classification Search
CPC .................................................... G06F 21/554
See application file for complete search history.

(56) References Cited

U.S. PATENT DOCUMENTS

| 10,043,011 | B2 * | 8/2018 | Abdine | G06F 21/577 |
| 10,587,642 | B1 * | 3/2020 | Herman-Saffar | H04L 63/1433 |
| 2007/0266138 | A1 * | 11/2007 | Spire | G06F 11/0709 709/223 |
| 2014/0283049 | A1 * | 9/2014 | Shnowske | H04L 63/1441 726/23 |
| 2016/0239772 | A1 * | 8/2016 | Dahlberg | G06F 16/23 |
| 2018/0295145 | A1 * | 10/2018 | Brow | H04L 63/1425 |
| 2019/0149396 | A1 * | 5/2019 | Zafer | H04L 41/0631 709/224 |

\* cited by examiner

*Primary Examiner* — Simon P Kanaan
(74) *Attorney, Agent, or Firm* — Nicholson De Vos Webster & Elliot LLP

(57) ABSTRACT

The technology presented herein improves incident handling in an IT environment. In a particular example, a method provides identifying a first incident in the IT environment. From incident handling information that indicates how a plurality of previous incidents were handled by one or more users, the method provides identifying first information of the incident handling information corresponding to one or more first previous incidents of the plurality of previous incidents that are similar to the first incident. The method further provides determining a suggested course of action from the first information and presenting the suggested course of action to a user of the information technology environment.

30 Claims, 9 Drawing Sheets

US 10,936,716 B1

INCIDENT HANDLING ASSISTANCE BASED ON PREVIOUS INCIDENT HANDLING

TECHNICAL BACKGROUND

An increasing number of data security threats exist in the modern computerized society. These threats may include viruses or other malware that attack a local computer of an end user, or sophisticated cyber-attacks to gather data from or otherwise infiltrate a complex information technology (IT) environment. Such IT environments include real and virtual computing devices executing various applications used to provide a variety of services, such as data routing and storage, cloud processing, web sites and services, amongst other possible services. To protect applications and services, various antivirus, encryption, and firewall tools may be used across an array of computing devices and operating systems, such as Linux® and Microsoft Windows®.

When an IT environment identifies an incident, an incident handling user may instruct a computing system of the IT environment, such as the user's own workstation, to perform various functions in response to the incident. The incident may be something that a user or system in the IT environment identifies as being associated with a potential threat. For example, a user in the IT environment may receive a suspicious email and the user, or a spam filter of the user's email application, may flag that email as being a potential threat. In another example, a server in the IT environment may receive an excessive number of requests form a particular network address or network domain and may flag those requests as a potential threat. Upon being notified of the incident, the incident handling user determines which functions should be performed in response to the incident. Since the user may not have recently, or ever, handled a similar incident, the user may not recall or learn the functions in a timely manner if at all.

OVERVIEW

The technology presented herein improves incident handling in an IT environment. In a particular example, a method provides identifying a first incident in the IT environment. From incident handling information that indicates how a plurality of previous incidents were handled by one or more users, the method provides identifying first information of the incident handling information corresponding to one or more first previous incidents of the plurality of previous incidents that are similar to the first incident. The method further provides determining a suggested course of action from the first information and presenting the suggested course of action to a user of the information technology environment.

DETAILED DESCRIPTION

For a particular IT environment, one or more administrative users can be tasked with maintaining the devices, systems, and networks of the IT environment. Maintenance tasks may include handling any security threats that the IT environment encounters. Incidents that may constitute security threats may include malware (e.g, viruses, worms, ransomware, etc.), denial of service attacks, unauthorized access attempts, information fishing schemes, or some other type of computer or network related event that could adversely affect the IT environment or users of the IT environment. Upon being notified of an incident, an administrative user uses tools provided by the IT environment to perform various actions for handling the incident. The tools may include functions that, depending on the type of incident, find the source of the incident (e.g., a source address or domain of a network attack), remove an offending process (e.g., deleting malware), isolate an affected asset of the IT environment in a VLAN, identify assets related to the affected asset, implementing a firewall rule (e.g., to block certain network traffic), or any other action for identifying whether an incident is a security threat and, if so, to neutralize the security threat.

The actions taken by a user when handling one type of incident may be different from those taken when handling a different type of incident. If the user has not handled a similar incident recently, the user may take longer than desired to perform actions necessary to handle the incident. Likewise, the user may unnecessarily perform actions that are ineffective at handling the incident because the user may not know any better. The examples herein assist the user in at least the aforementioned situations by suggesting a course of action to the user. A suggested course of action can include one or more ordered or unordered actions that should be performed when handling an incident. The one or more actions can be determined based on how previously observed similar incidents were successfully or unsuccessfully handled.

Figure 1:
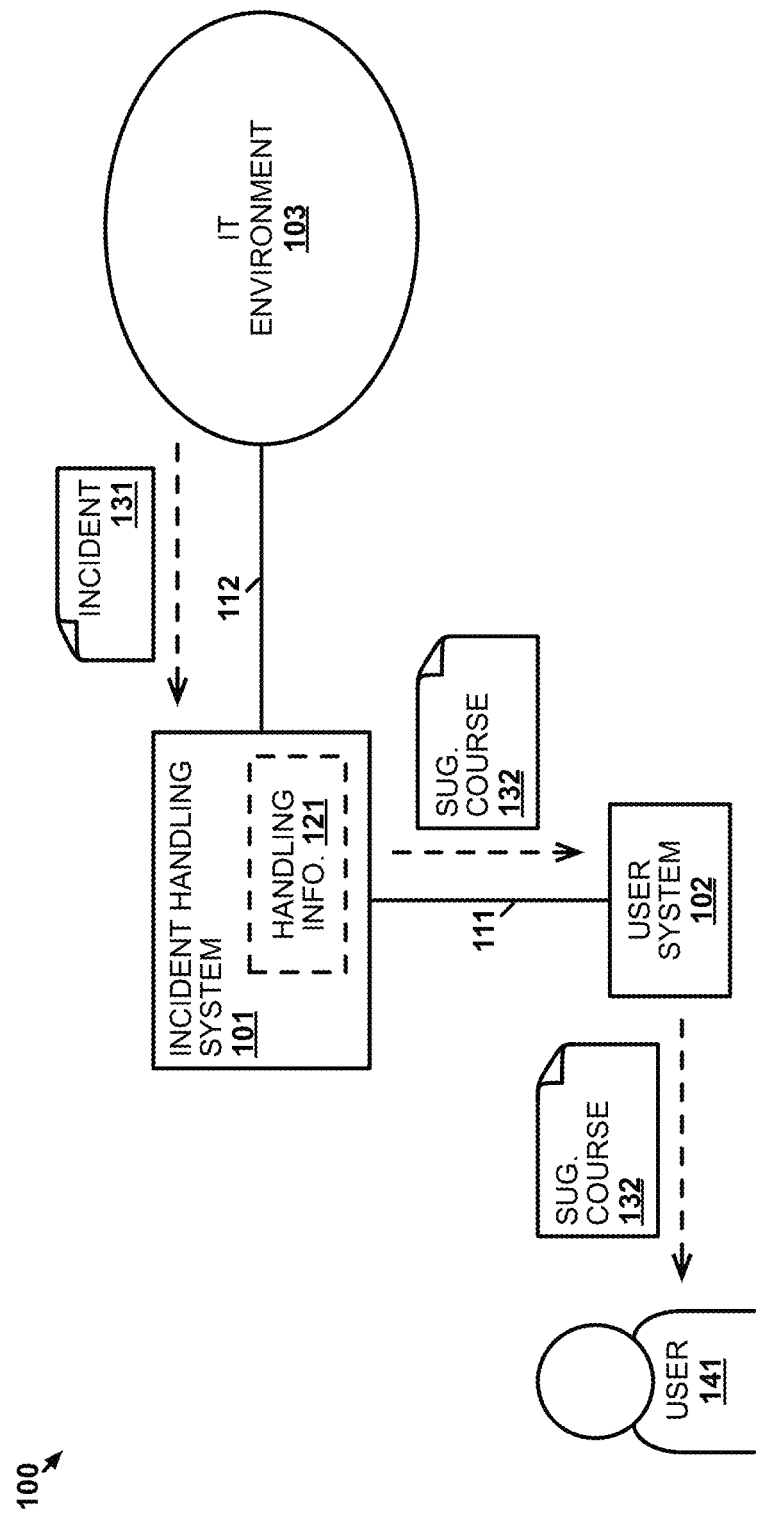
FIG. 1 illustrates an example network computing environment for suggesting a course of action to handle an IT incident.

FIG. 1 illustrates network computing environment 100 for suggesting a course of action to handle an IT incident. Network computing environment 100 includes incident handling system 101, user system 102, and IT environment 103. Incident handling system 101 and user system 102 communicate over communication link 111. Incident handling system 101 and IT environment 103 communicate over communication link 112. Communication link 111 and communication link 112 may be direct links or may include one or more intervening systems, networks, or devices. While shown outside of IT environment 103, incident handling system 101 and user system 102 may be considered part of IT environment 103.

In operation, user 141 is one of what may be multiple users tasked with handling incidents that may be security threats to IT environment 103. User 141 operates user system 102, which may be a personal workstation or other computing device associated with or used by user 141, to receive information about incidents that occur in IT environment 103 and to instruct incident handling system 101 to handle those incidents by performing various actions. In some examples, user 141 may operate incident handling system 101 directly through a user interface thereof rather than using a separate system, such as user system 102. Likewise, in some examples, the tasks performed by user system 102 and incident handling system 101 described herein may be distributed between user system 102 and incident handling system 101. In such examples, the combination of incident handling system 101 and user system 102 as a whole may be considered an incident handling system.

Figure 2:
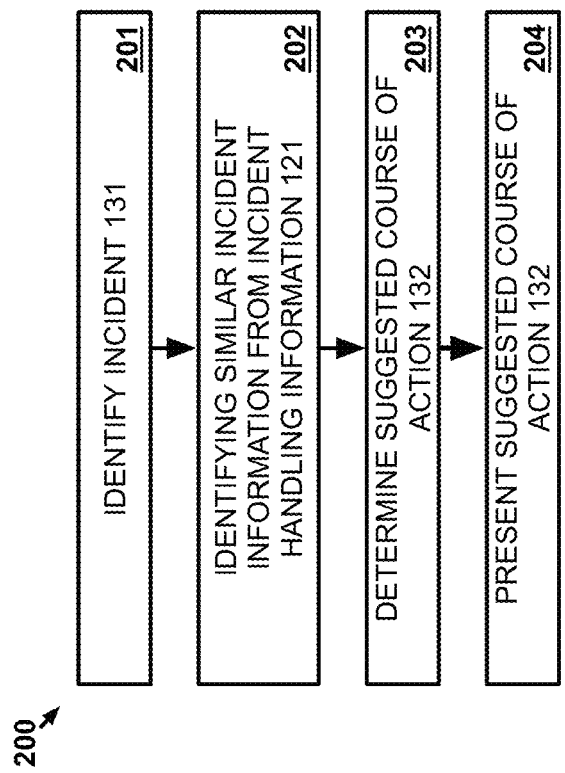
FIG. 2 illustrates an example operational scenario for suggesting a course of action to handle an IT incident.

FIG. 2 illustrates operational scenario 200 of network computing environment 100 for suggesting a course of action to handle an IT incident. Operational scenario 200 describes an example whereby incident handling system 101 provides user 141 with suggested course of action 132 to assist user 141 when handling incident 131 identified in IT environment 103. In some embodiments, incident 131 represents an alert or notification of the corresponding incident detected in IT environment 103. Such alerts of notifications can be provided by a component or function of the IT environment or a computing device or function external to IT environment 103. In other embodiments, incident 131 represents information regarding the corresponding incident detected in IT environment 103. The guidance provided to user 141 by suggested course of action 132 can improve the effectiveness of user 141 to handle of incident 131 by removing the need for user 141 to determine a course of action from scratch or on their own, which may be difficult depending on how long it has been since user 141 handled an incident similar to incident 131. Incident handling system 101 further improves its own operation by avoiding, not suggesting, or warning against performance of actions that would be ineffective or unnecessary for handling incident 131.

Operational scenario 200 begins with incident handling system 101 identifying incident 131 (201). Incident handling system 101 may identify incident 131 by receiving a notification of incident 131 from IT environment 103. Incident handling system 101 may receive notification of incident 131 from one or more network or computing elements within IT environment 103, such as one or more network firewalls, anti-malware software executing on one or more computing system, spam filters executing on one or more computing systems, or some other type of mechanism for identifying incidents that could be potential security threats.

Incident handling system 101 maintains and stores, or otherwise has access to, incident handling information 121. Incident handling information 121 indicates how one or more users, which may include user 141, handled previous incidents. Specifically, incident handling information 121 indicates what actions were taken to handle the previous incidents included in incident handling information 121. Incident handling information 121 may only include information corresponding to successful incident handling instances or may indicate which incident handling instances were successful and which were unsuccessful. Incident handling system 101 may collect incident handling information 121 itself or may rely on another system to collect incident handling information 121. Incident handling information 121 may be associated with incidents from IT environment 103 or may include information regarding incidents from other IT environments.

From incident handling information 121, incident handling system 101 can identify information corresponding to one or more previous incidents that are similar to incident 131 (202). Incident handling system 101 may determine one or more characteristics of incident 131 and compare those characteristics to one or more characteristics of incidents included in incident handling information 121. Incidents in incident handling information 121 having sufficiently similar characteristics (e.g., having a threshold percentage of matching characteristics) may be identified as being similar incidents by incident handling system 101.

Incident handling system 101 determines suggested course of action 132 based on the information identified above from incident handling information 121 (203). In general, incident handling system 101 determines which actions were taken when handling previous incidents similar to incident 131, presumes or determines that those same actions will be effective when handling incident 131, and includes an indication of those actions in suggested course of action 132. Not all similar incidents will have been handled using the exact same actions. Incident handling system 101 may therefore use one or more criterion to determine whether a particular action should be included in suggested course of action 132. For example, an action may need to be performed in a threshold (e.g., 85%) number of instances for handling similar incidents before incident handling system 101 includes that action in suggested course of action 132. In some examples, only those actions from courses of action having a high enough success rate handling previous incidents (e.g., above 90%) will be included. In some examples, a frequency in which an action is used in a course of action to handle incidents similar to incident 131 may be included (e.g., used more than 80% of the time). In yet further examples, how recent an action was used to handle an incident (e.g., within the last X-number of days) or how quickly an incident was resolved using the action (e.g., a course of action with one action resolved an incident similar to incident 131 5 minutes faster than a course of action with another action, so the one action would be included). Of course, many factors, including those from the above examples, may be considered when determining whether to include an action and may be weighted depending on importance.

In some examples, incident handling system 101 may consider the sequence or parallel nature of actions when generating suggested course of action 132. Some actions may always be performed before other actions, while some actions may be performed in parallel with other actions. Likewise, some actions may require a given sequence due to the output of one action effecting a subsequent action (e.g., used as input for a subsequent action or used as basis for a decision at a subsequent decision point). To ensure consistency, a suggested course of action 132 may maintain the sequential or parallel nature of actions indicated therein.

Once suggested course of action 132 is generated, incident handling system 101 presents suggested course of action 132 to user 141 (204). In this example, incident handling system 101 presents suggested course of action 132 to user 141 by transferring suggested course of action 132 to user system 102. Upon receiving suggested course of action 132, user system 102 displays, audibly describes, or otherwise provides suggested course of action 132 to user 141 via a user interface of user system 102. In some examples, user 141 may direct incident handling system 101 to proceed with automatically performing the actions specified by suggested course of action 132 via input into user system 102, may amend suggested course of action 132, may manually instruct incident handling system 101 to perform one or more actions specified in suggested course of action 132 on an individual action basis, use suggested course of action 132 for some other purpose—including combinations thereof.

Figure 3:
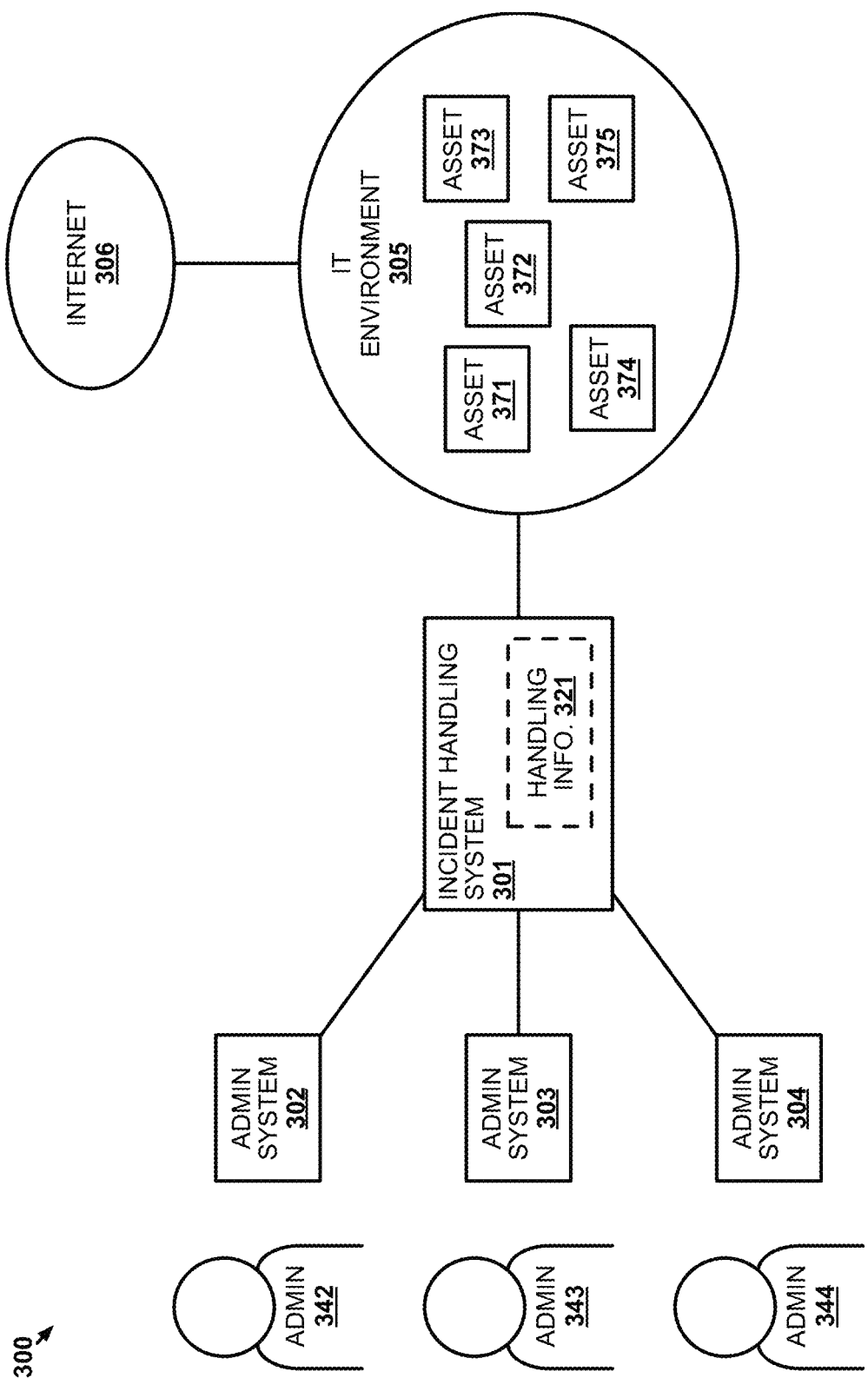
FIG. 3 illustrates another example network computing environment for suggesting a course of action to handle an IT incident.

FIG. 3 illustrates network computing environment 300 for suggesting a course of action to handle an IT incident. Network computing environment 300 includes incident handling system 301, administrative user system 302, administrative user system 303, administrative user system 304, IT environment 305, and Internet 306. Asset 371, asset 372, asset 373, asset 374, and asset 375 may comprise any combination of physical computing systems (e.g. personal computing systems, host computing systems, servers, and the like), virtual computing systems (e.g. virtual machines or containers), routers, switches, or some other similar computing component. While Internet 306 is shown connected only to IT environment 305, Internet 306 may be used for communications with any element of network computing environment 300.

In operation, administrator 342, administrator 343, and administrator 344 are users associated with maintaining the security of IT environment 305. Administrator 342, administrator 343, and administrator 344 operate administrative user system 302, administrative user system 303, and administrative user system 304, respectively, to perform their duties with respect to the security of IT environment 305. Administrative user system 302, administrative user system 303, and administrative user system 304 communicate with incident handling system 301 to handle incidents that occur within IT environment 305.

Figure 4:
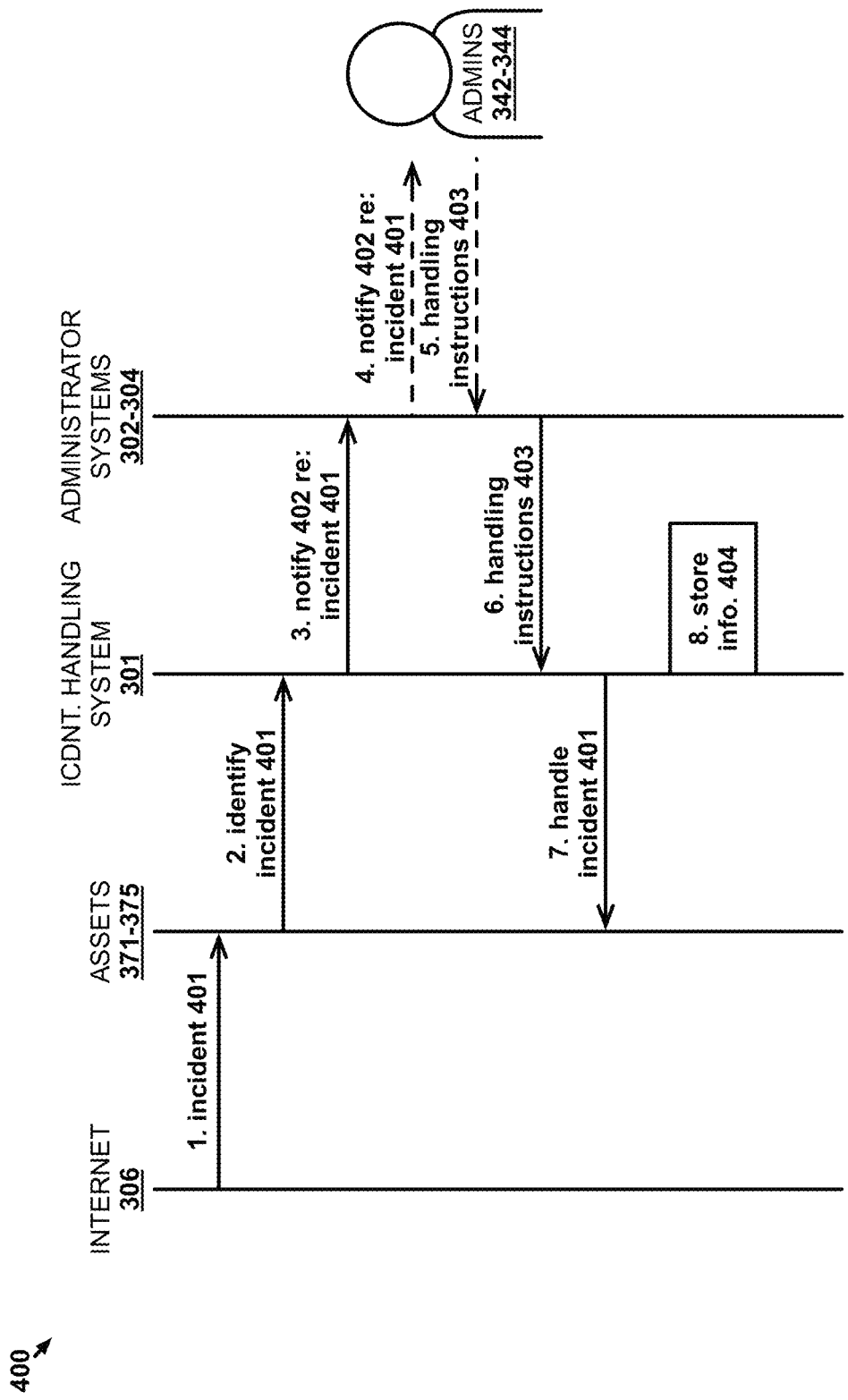
FIG. 4 illustrates an example operational scenario for suggesting a course of action to handle an IT incident.

FIG. 4 illustrates operational scenario 400 of network computing environment 300 for suggesting a course of action to handle an IT incident. Operational scenario 400 describes how incident handling system 301 generates incident handling information 321 from incidents in IT environment 305. In other examples, incident handling information 321 may be generated by a different system or generated from incidents handled in other IT environments in a manner similar to that described below.

In operational scenario 400, incident 401 occurs at step 1 that originates from Internet 306 and affects one or more of assets 371-375. In other examples, incident 401 may originate from within IT environment 305 (e.g., a user may install malware onto one of assets 371-375). After occurrence of incident 401, incident handling system 301 identifies incident 401 at step 2 by being notified of incident 401 from assets 371-375. For example, if one of assets 371-375 is a firewall that detects suspicious network behavior as being incident 401, then the firewall will notify incident handling system 301 of incident 401. The notification of incident 401 may include information describing characteristics of incident 401, such as a source network address/domain, incident type (e.g., virus, fishing, denial of service attack, unauthorized access request, etc.), which of assets 371-375 were affected, or any other type of information descriptive of incident 401 that may also be used to compare incident 401 to other incidents.

Upon identifying incident 401, incident handling system 301 transfers notification 402 to one or more of administrator user systems 302-304 at step 3 that incident 401 has occurred. For example, incident handling system 301 may select one of administrators 342-344 to handle incident 401 and transfer notification 402 to one of administrator user systems 302-304 associated with the selected administrator. In an alternative example, incident handling system 301 may transfer notification 402 to multiple, or all, of administrator user systems 302-304 and allow administrators 342-344 to decide who should handle incident 401. Notification 402 may include at least a portion of the characteristics mentioned above to assist in determining which of administrators 342-344 will handle incident 401.

The administrator user systems 302-304 that receive notification 402, responsively present notification 402 at step 4 to an associated corresponding one of administrators 342-344. In some examples in which notification 402 includes characteristics about incident 401, as discussed above, at least a portion of those characteristics may also be presented either automatically or at the request of one of administrators 342-344. One or more of administrators 342-344 responsively handles incident 401 by providing handling instructions 403 at step 5 to their respective administrator user systems 302-304. Handling instructions 403 are then passed at step 6 from the one of administrator user systems 302-304 that received them to incident handling system 301. Handling instructions 403 instruct incident handling system 301 to perform one or more actions to handle the incident 401. Upon receiving handling instructions 403, incident handling system 301 carries out incident handling system 301 at step 7 by interacting with any of assets 371-375 necessary to comply with handling instructions 403. For example, if one of handling instructions 403 is to create a firewall rule, then incident handling system 301 may create the firewall rule and transfer the firewall rule to one or more of assets 371-375 that comprise a firewall. Incident handling system 301 may be able to perform a portion of the actions without interacting with assets 371-375 or may interact with systems outside of IT environment 305 to perform a portion of the actions. In some examples, handling instructions 403 may only indicate one action at a time for incident handling system 301 to perform. As such, steps 5-7 may be repeated until incident 401 has been handled sufficiently.

Once incident 401 has been handled, incident handling system 301 can collect or store information 404 describing the handling of incident 401 at step 8 to incident handling information 321, which may already include information describing previously handled incidents. Information 404 includes at least a portion of the characteristics of incident 401 discussed above and a description of the actions performed by incident handling system 301 to handle incident 401 so that incident handling system 301 can replicate the handling of incident 401 for a future incident similar to incident 401. Operational scenario 400 may continue to occur for subsequent incidents to continue adding information for those subsequent incidents into incident handling information 321.

Figure 5:
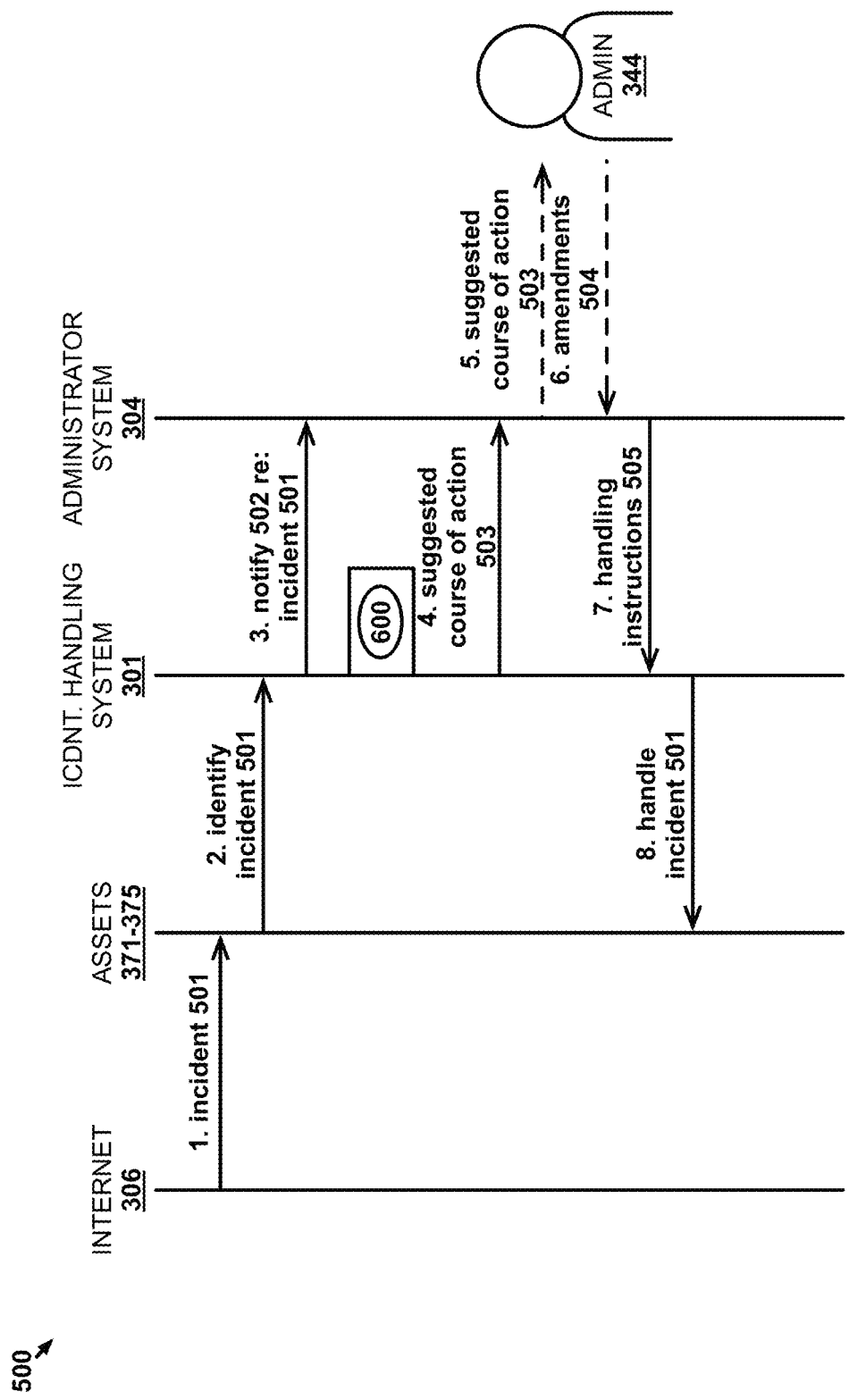
FIG. 5 illustrates another example operational scenario for suggesting a course of action to handle an IT incident.

FIG. 5 illustrates operational scenario 500 of network computing environment 300 for suggesting a course of action to handle an IT incident. Operational scenario 500 begins very similarly to operational scenario 400 in that incident 501 occurs at step 1, incident handling system 301 identifies incident 501 at step 2, and incident handling system 301 transfers a notification 502 at step 3. In this example, a single one of administrator user systems 302-304, administrative user system 304, is selected for receipt of notification 502 from incident handling system 301.

In this example, incident handling system 301 further determines suggested course of action 503 via operational scenario 600, discussed further below, and transfers the suggested course of action 503 to administrative user system 304 at step 4. In this example, suggested course of action 503 is displayed at step 5 to administrator 344 by administrative user system 304. Administrator 344 views suggested course of action 503 to determine whether the actions and sequence of actions, along with any decision points therein requires amendments. Administrator 344 may indicate through input to administrative user system 304 that suggested course of action 503 is acceptable as is, however, administrator 344 inputs amendments 504 into administrative user system 304 at step 6 in this example. Amendments 504 may include adding or deleting one or more actions of suggested course of action 503, adding/deleting decision points of suggested course of action 503, defining an undefined decision point of suggested course of action 503, reordering actions of suggested course of action 503, or some other type of modification.

Handling instructions 505 in accordance with the actions and decision points specified by suggested course of action 503 after having amendments 504 applied are transferred by administrative user system 304 at step 7 to incident handling system 301. In some examples, handling instructions 505 may simply comprise suggested course of action 503 with amendments 504 applied thereto such that incident handling system 301 follows the specified actions and decision points to handle incident 501. In other examples, administrative user system 304 may follow the specifications of suggested course of action 503 with amendments 504 and generate handling instructions 505 accordingly as though handling instructions 505 were manually provided by administrator 344 rather than through suggested course of action 503. Regardless of whether administrative user system 304 or incident handling system 301 interprets suggested course of action 503 with amendments 504 applied, incident handling system 301 interacts with assets 371-375 to handle incident 501 in accordance with suggested course of action 503 with amendments 504 applied. Incident handling system 301 may be able to perform a portion of the actions specified by suggested course of action 503 having amendments 504 without interacting with assets 371-375 or may interact with systems outside of IT environment 305 to perform a portion of the actions.

In some examples, handling instructions 505 and characteristics of incident 501 may be stored in incident handling information 321 for use when generating a suggested course of action for a subsequent incident similar to incident 501.

Figure 6:
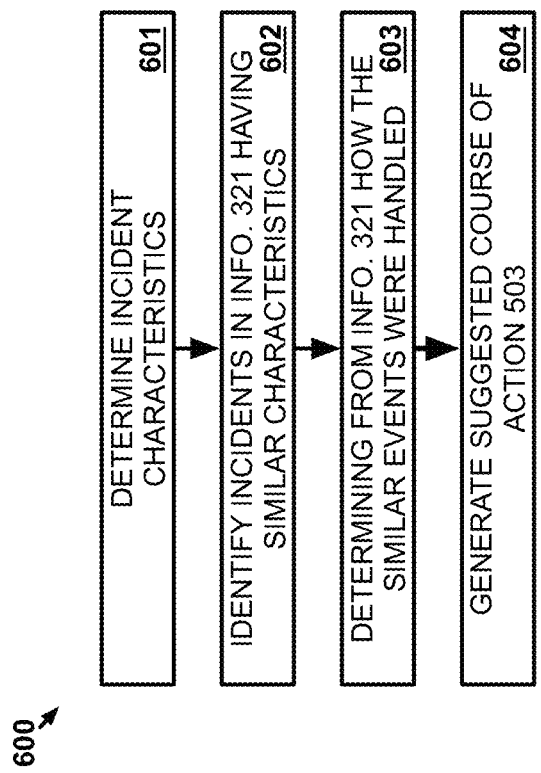
FIG. 6 illustrates yet another example operational scenario for suggesting a course of action to handle an IT incident.

FIG. 6 illustrates operational scenario 600 of network computing environment 300 for suggesting a course of action to handle an IT incident. Specifically, operational scenario 600 describes an example for how incident handling system 301 generates suggested course of action 503. Incident handling system 301 determines characteristics of incident 501 (601). The characteristics of incident 501 may be supplied at least in part from assets 371-375 when assets 371-375 identifies incident 501 to incident handling system 301 in step 2 of operational scenario 500. In some examples, incident handling system 301 may request at least a portion of characteristics of incident 501 from assets 371-375 or from some other system. Characteristics of incident 501 may include a source network address/domain, incident type (e.g., virus, fishing, denial of service attack, unauthorized access request, etc.), which of assets 371-375 were affected, or any other type of information descriptive of incident 501 that may be used to compare incident 501 to other incidents.

Incident handling system 301 identifies previously handled incidents in incident handling information 321 having characteristics similar to those of incident 501 (602). A previously handled incident may have similar characteristics if a predefined number of characteristics (e.g., a percentage of the characteristics) are the same or similar to those of incident 501. In some examples, certain characteristics may weigh more heavily than others for similarity determination purposes. For example, if a previous handled incident is of the same event type as incident 501 and comes from the same domain as incident 501, then incident handling system 301 may determine that the previously handled incident is similar due to even type and domain being heavily weighted characteristics. Other manners of defining whether incidents are similar based on their characteristics may also be used.

Once one or more previously handled incidents in incident handling information 321 are identified by incident handling system 301, incident handling system 301 determines from incident handling information 321 how the previously handled incidents were handled (603). As described above, incident handling information 321 stores the actions taken to handle the previously handled incidents.

From the actions of the previously handled similar incidents, incident handling system 301 generates suggested course of action 503 (604). Incident handling system 301 may include all actions from the previously handled similar incidents or may include only a portion of the actions in suggested course of action 503. Incident handling system 301 may also maintain the sequence of actions for suggested course of action 503. In some examples, incident handling system 301 may use criteria to determine whether a particular action should be included in suggested course of action 503. For instance, incident handling system 301 may require that a given action be performed in a certain percentage of the previously handled similar incidents before the action is included in suggested course of action 503. Similarly, the order in which the actions are performed may be considered, which may help incident handling system 301 determine decision points. For example, if a second action was performed after a first action when handling some incidents but a third action is performed after the first action when handling some other incidents, then incident handling system 301 may determine that a decision was made by one of administrators 342-344 about whether to perform either the second or the third action after the first action. Incident handling system 301 may therefore place a decision point in suggested course of action 503 after the first action. If incident handling system 301 cannot infer the decision that led to the second action being performed over the third action (or vice versa), then incident handling system 301 may include an undefined decision point in suggested course of action 503 and request that administrator 344 define the decision point. In some cases, as noted above, a suggested course of action may be saved in incident handling information 321 for a similar incident and the decision point may be defined by that suggested course of action for replication in suggested course of action 503.

Figure 7:
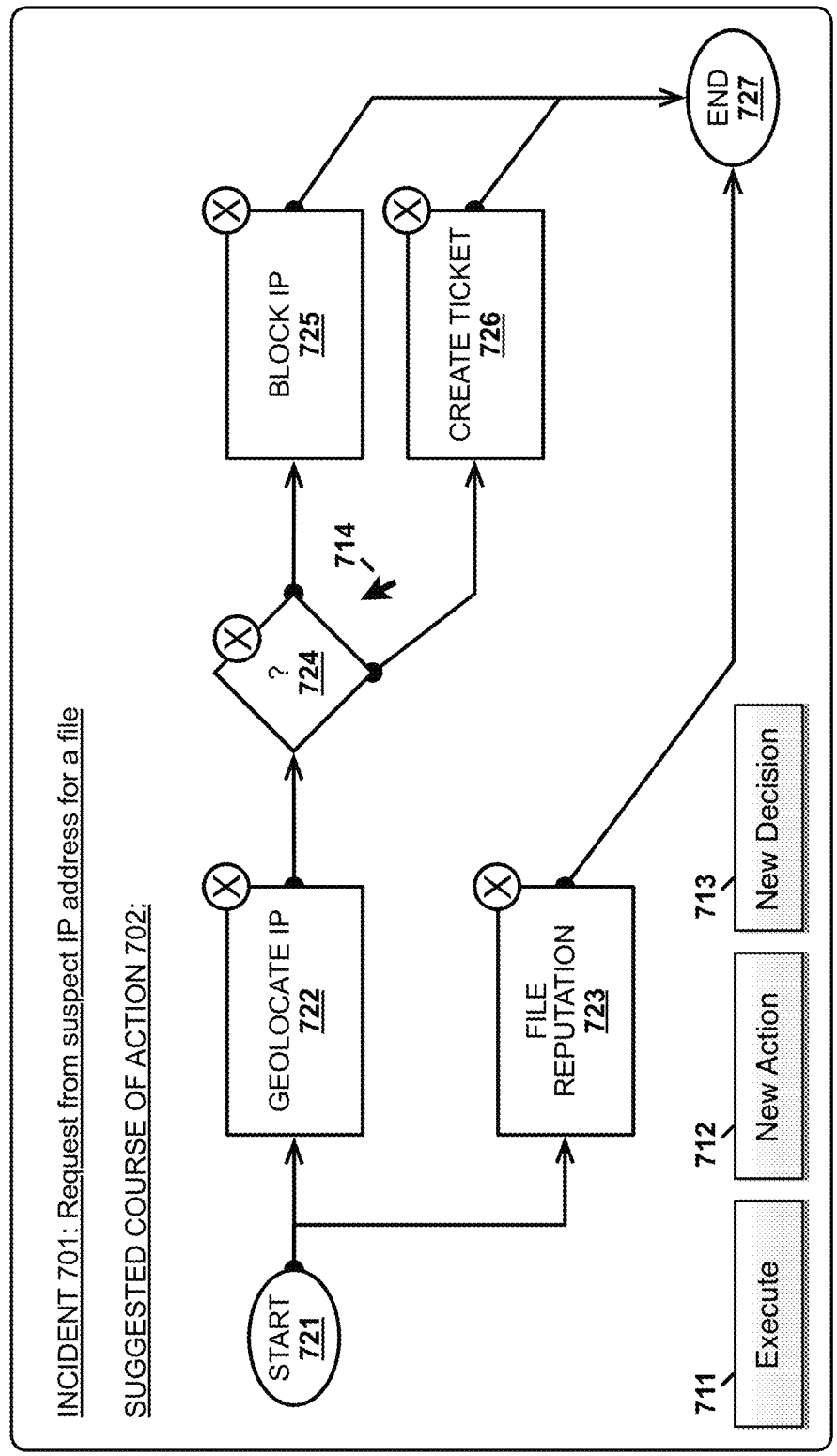
FIG. 7 illustrates an example user interface for suggesting a course of action to handle an IT incident.

FIG. 7 illustrates user interface 700 of network computing environment 300 for suggesting a course of action to handle an IT incident. User interface 700 is an example of how one of administrator user systems 302-304 displays a suggested course of action, suggested course of action 702 for incident 701 in this case, to one of administrators 342-344. Suggested course of action 702 is represented as a block flow diagram in user interface 700. Suggested course of action 702 includes start point 721, end point 727, decision point 724, and four action blocks, which include geolocate IP action 722, file reputation action 723, block IP action 725, and create ticket action 726. The block diagram representing suggested course of action may comprise a visual programming language for courses of action, which allows for graphical manipulation (e.g., by manipulating the blocks in this example) of the course of action. Of course, the actions described in suggested course of action 702 may be different for suggested courses of action for incidents other than incident 701.

In addition to a visual representation of suggested course of action 702, user interface 700 further includes user interface elements execute button 711, new action button 712, and new decision point button 713. When selected by one of administrators 342-344, execute button 711 causes incident handling system 301 to perform the actions specified in accordance with suggested course of action 702 in a manner like that described above for steps 7 and 8 of operational scenario 500. When selected by one of administrators 342-344, new action button 712 adds a new action to suggested course of action 702. When selected by one of administrators 342-344, new decision point button 713 adds a new decision point to suggested course of action 702. Cursor 714 may be used to move blocks around on user interface 700, indicate to which blocks connectors should attach, select "X" elements on blocks to delete the blocks, or perform some other type of user interface manipulation. It should be understood that other forms of interacting with user interface 700 may also or instead be used, such as via touch input to a touchscreen.

In this example, incident handling system 301 determined that geolocate IP action 722 and file reputation action 723 can be performed in parallel and, therefore, split into two paths from start point 721. After geolocate IP action 722 is performed, incident handling system 301 determined that a portion of previous incidents similar to incident 701 performed block IP action 725 while another portion of previous incidents similar to incident 701 performed create ticket action 726. Accordingly, incident handling system 301 placed decision point 724 after geolocate IP action 722 in suggested course of action 702. In this example, incident handling system 301 was unable to determine the logic used for decision point 724 and therefore left decision point 724 undefined, as indicated by the question mark therein.

Figure 8:
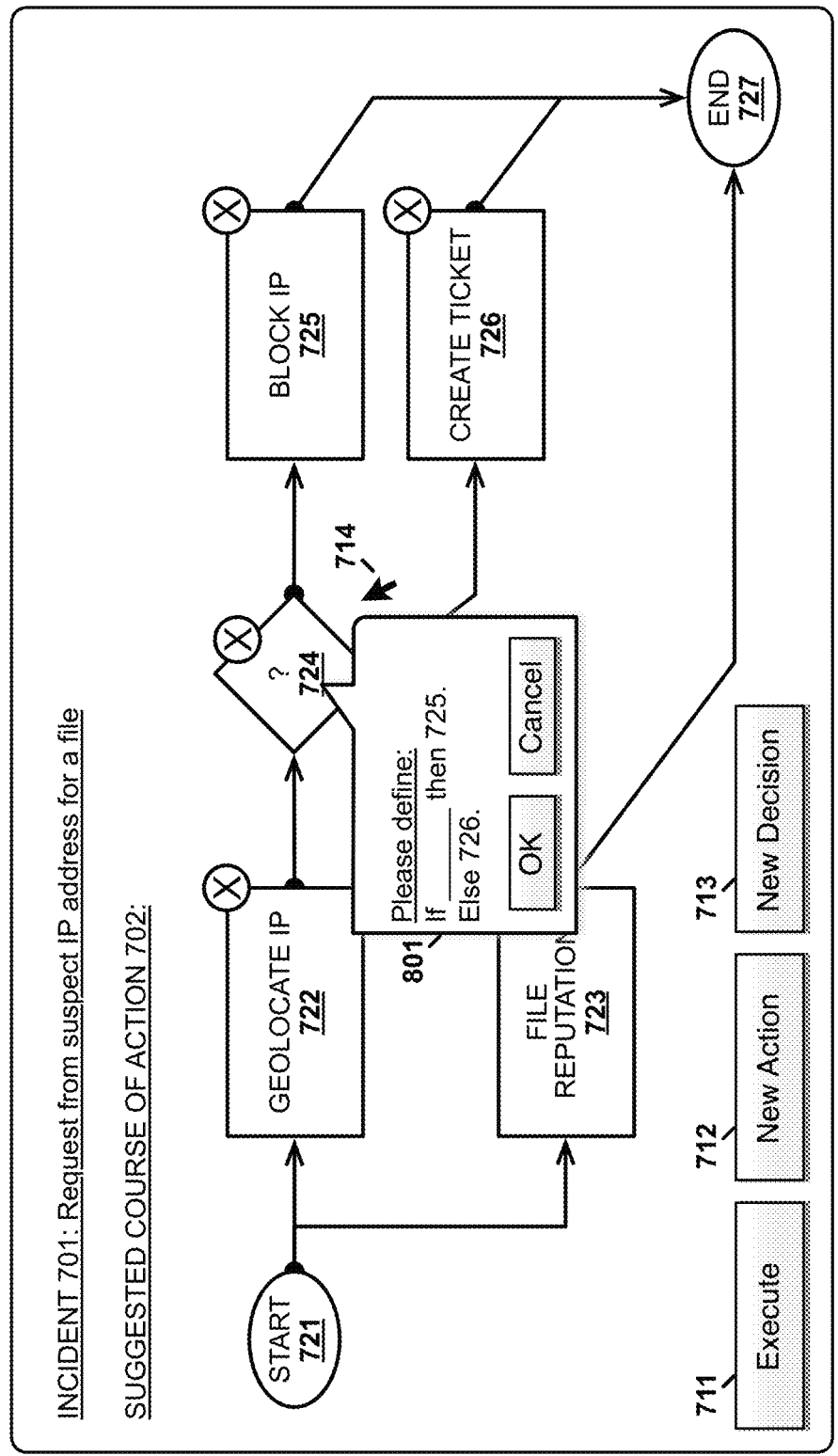
FIG. 8 illustrates another example user interface for suggesting a course of action to handle an IT incident.

FIG. 8 illustrates user interface 800 of network computing environment 300 for suggesting a course of action to handle an IT incident. In this example, user interface 800 corresponds to user interface 700 after one of administrators 342-344 selects decision point 724 with cursor 714. Popup interface element 801 is displayed responsive to the selection of decision point 724. Popup interface element 801 asks for one of administrators 342-344 to provide amending input defining whether suggested course of action 702 proceeds to block IP action 725 or create ticket action 726 after geolocate IP action 722. Manners of requesting decision point definition other than popup interface element 801 may also be used. In this case, the input may be provided to the blank space after "if" in popup interface element 801, although alternative forms of accepting input may be used in other examples. In one example, the input may define that if geolocate IP action 722 determines that the source IP address of incident 701 is in a particular geographic region, then block IP action 725 should be performed. Otherwise, create ticket action 726 is performed. Once decision point 724 is defined, execute button 711 may be selected by cursor 714 to proceed with performing suggested course of action 702. That is, responsive to a selection of execute button 711, suggested course of action 702 acts as an instruction set for which actions incident handling system 301 should perform and for what order incident handling system 301 should perform those actions.

Figure 9:
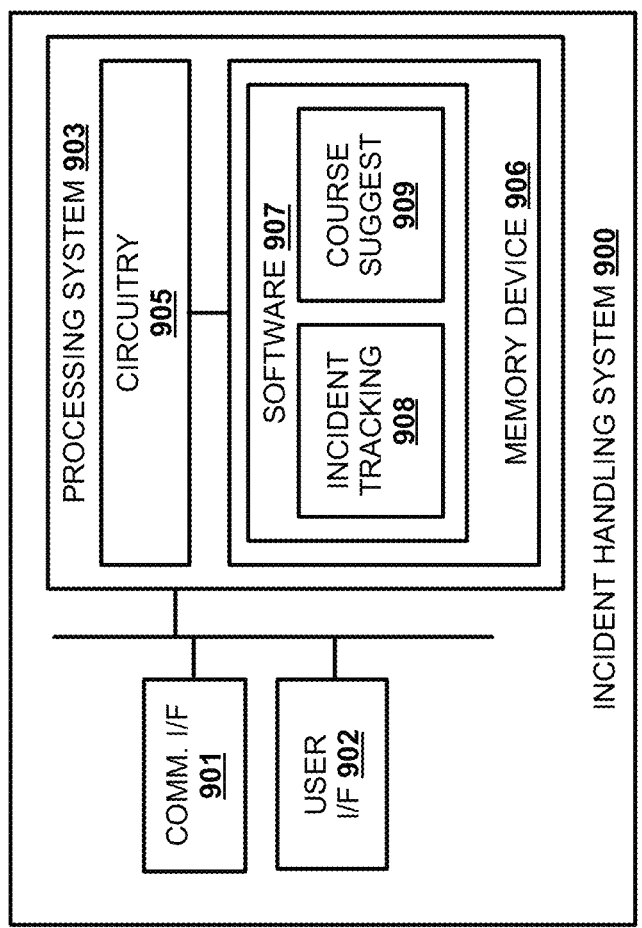
FIG. 9 illustrates an example computing architecture for suggesting a course of action to handle an IT incident.

FIG. 9 illustrates incident handling system 900 for suggesting a course of action to handle an IT incident. Incident handling system 900 is an example computing architecture for incident handling system 101 and incident handling system 301, although alternative configurations may also be used. Incident handling system 900 may similarly be an example architecture for other elements described above, such as user system 102, administrative user system 302, administrative user system 303, and administrative user system 304, although alternative configurations may also be used. Incident handling system 900 comprises communication interface 901, user interface 902, and processing system 903. Processing system 903 is linked to communication interface 901 and user interface 902. Processing system 903 includes processing circuitry 905 and memory device 906 that stores operating software 907.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof.

User interface 902 comprises components that interact with a user. User interface 902 may include a keyboard, display screen, mouse, touch pad, or some other user input/output apparatus. User interface 902 may be omitted in some examples.

Processing circuitry 905 comprises processing circuitry, such as a microprocessor, and other circuitry that retrieves and executes operating software 907 from memory device 906. Memory device 906 comprises one or more computer readable storage media, such as a disk drive, flash drive, data storage circuitry, or some other memory apparatus that in no cases should be considered a mere propagated signal. Operating software 907 comprises computer programs, firmware, or some other form of machine-readable processing instructions. Operating software 907 includes incident tracking module 908 and course suggestion module 909. Operating software 907 may further include an operating system, utilities, drivers, network interfaces, applications, or some other type of software. When executed by circuitry 905, operating software 907 directs processing system 903 to operate incident handling system 900 as described herein.

In particular, incident tracking module 908 directs processing system 903 to identify a first incident in an IT environment. From incident handling information that indicates how a plurality of previous incidents were handled by one or more users, incident tracking module 908 directs processing system 903 to identify first information of the incident handling information corresponding to one or more first previous incidents of the plurality of previous incidents that are similar to the first incident. course suggestion module 909 directs processing system 903 to determine a suggested course of action from the first information and present the suggested course of action to a user of the IT environment.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for improving incident handling in an information technology (IT) environment, the method comprising:
   identifying, by an incident handling system, an incident in the IT environment;
   identifying, by searching incident handling information stored by the incident handling system, one or more previous incidents identified by the incident handling system and that are similar to the incident, wherein the incident handling information indicates one or more courses of action executed by the incident handling system to respond to the one or more previous incidents, and wherein a course of action of the one or more courses of action includes a defined set of actions that are executable by the incident handling system;
   selecting, from the one or more courses of action, a set of actions;
   generating a suggested course of action using a defined ordering of the set of actions; and
   executing, by the incident handling system, the suggested course of action in the IT environment.

2. The method of claim 1, further comprising:
   causing display of a notification of the incident.

3. The method of claim 1, further comprising:
   receiving input indicating a change to the suggested course of action; and
   updating the suggested course of action based on the input.

4. The method of claim 1, further comprising:
   receiving input indicating a change to the suggested course of action, wherein the change comprises one or more of adding one or more actions into the suggested course of action, deleting one or more actions from the suggested course of action, or defining an undefined decision point within the suggested course of action; and
   updating the suggested course of action based on the input.

5. The method of claim 1, further comprising:
   storing the suggested course of action for use with a future incident similar to the incident.

6. The method of claim 1, further comprising:
   storing the suggested course of action for use with a future incident similar to the incident; and
   responsive to identifying the future incident, automatically executing the suggested course of action.

7. One or more computer readable storage media having program instructions stored thereon for improving incident handling in an information technology (IT) environment, the program instructions, when read and executed by a processing system, direct the processing system to:
   identify, by an incident handling system, an incident in the IT environment;
   identify, by searching incident handling information stored by the incident handling system, one or more previous incidents identified by the incident handling system and that are similar to the incident, wherein the incident handling information indicates one or more courses of action executed by the incident handling system to respond to the one or more previous incidents, and wherein a course of action of the one or more courses of action includes a defined set of actions that are executable by the incident handling system;
   selecting, from the one or more courses of action, a set of actions;
   generate a suggested course of action using a defined ordering of the set of actions; and
   execute, by the incident handling system, the suggested course of action in the IT environment.

8. The one or more computer readable storage media of claim 7, wherein the program instructions further direct the processing system to:
   causing display of a notification of the incident.

9. The one or more computer readable storage media of claim 7, wherein the program instructions further direct the processing system to:
   receive input indicating a change to the suggested course of action; and
   updating the suggested course of action based on the input.

10. The one or more computer readable storage media of claim 7, wherein the program instructions further direct the processing system to:
    receive input indicating a change to the suggested course of action;
    wherein the change comprises one or more of adding one or more actions into the suggested course of action, deleting one or more actions from the suggested course of action, and defining an undefined decision point within the suggested course of action; and
    updating the suggested course of action based on the input.

11. The one or more computer readable storage media of claim 7, wherein the program instructions further direct the processing system to:
    store the suggested course of action for use with a future incident similar to the incident.

12. The one or more computer readable storage media of claim 11, wherein the program instructions further direct the processing system to:
    store the suggested course of action for use with a future incident similar to the incident; and
    responsive to identifying the future incident, automatically execute the suggested course of action.

13. An apparatus for improving incident handling in an information technology (IT) environment, the apparatus comprising:
    one or more computer readable storage media;
    a processing system operatively coupled with the one or more computer readable storage media; and
    program instructions stored on the one or more computer readable storage media that, when read and executed by the processing system, direct the processing system to:
    identify, by an incident handling system, a first incident in the IT environment;
    identify, by searching incident handling information stored by the incident handling system, one or more previous incidents identified by the incident handling system and that are similar to the incident, wherein the incident handling information indicates one or more courses of action executed by the incident handling system to respond to the one or more previous incidents, and wherein a course of action of the one or more courses of action includes a defined set of actions that are executable by the incident handling system;
    selecting, from the one or more courses of action, a set of actions;
    generate a suggested course of action using a defined ordering of the set of actions; and execute, by the incident handling system, the suggested course of action in the IT environment.

14. The apparatus of claim 13, wherein the program instructions further direct the processing system to:
  receive input indicating a change to the suggested course of action;
  wherein the change comprises one or more of adding one or more actions into the suggested course of action, deleting one or more actions from the suggested course of action, and defining an undefined decision point within the suggested course of action; and
  update the suggested course of action based on the input.

15. The method of claim 1, wherein the suggested course of action is generated by adding at least one action from the defined set of actions to the suggested course of action, wherein the suggested course of action includes a plurality of actions including the at least one action, and wherein the at least one action is associated with a defined execution sequencing.

16. The method of claim 1, wherein selecting an action of the set of actions includes:
  identifying an action that occurs in at least a threshold percentage of the one or more courses of action; and
  adding the action to the suggested course of action.

17. The method of claim 1, wherein selecting an action of the set of actions includes:
  identifying an action that was used in at least a threshold percentage of successful courses of action of the one or more courses of action; and
  adding the action to the suggested course of action.

18. The method of claim 1, further comprising:
  receiving input indicating a change to an execution order associated with the suggested course of action; and
  updating the suggested course of action based on the input.

19. The method of claim 1, further comprising causing display of a block flow diagram representing the course of action.

20. The method of claim 1, further comprising:
  causing display of a block flow diagram representing the course of action;
  receiving input indicating a modification to the block flow diagram representing the course of action; and
  updating the suggested course of action based on the input.

21. The one or more computer readable storage media of claim 7, wherein the suggested course of action is generated by adding at least one action from the defined set of actions to the suggested course of action, wherein the suggested course of action includes a plurality of actions including the at least one action, and wherein the at least one action is associated with a defined execution sequencing.

22. The one or more computer readable storage media of claim 7, wherein selecting an action of the set of actions includes:
  identifying an action that occurs in at least a threshold percentage of the one or more courses of action; and
  adding the action to the suggested course of action.

23. The one or more computer readable storage media of claim 7, wherein selecting an action of the set of actions includes:
  identifying an action that was used in at least a threshold percentage of successful courses of action of the one or more courses of action; and
  adding the action to the suggested course of action.

24. The one or more computer readable storage media of claim 7, wherein the program instructions further direct the processing system to:
  receive input indicating a change to an execution order associated with the suggested course of action; and
  update the suggested course of action based on the input.

25. The one or more computer readable storage media of claim 7, wherein the program instructions further direct the processing system to cause display of a block flow diagram representing the course of action.

26. The one or more computer readable storage media of claim 7, further comprising:
  causing display of a block flow diagram representing the course of action;
  receiving input indicating a modification to the block flow diagram representing the course of action; and
  updating the suggested course of action based on the input.

27. The apparatus of claim 13, wherein the suggested course of action is generated by adding at least one action from the defined set of actions to the suggested course of action, wherein the suggested course of action includes a plurality of actions including the at least one action, and wherein the at least one action is associated with a defined execution sequencing.

28. The apparatus of claim 13, wherein selecting an action of the set of actions includes:
  identifying an action that occurs in at least a threshold percentage of the one or more courses of action; and
  adding the action to the suggested course of action.

29. The apparatus of claim 13, wherein selecting an action of the set of actions includes:
  identifying an action that was used in at least a threshold percentage of successful courses of action of the one or more courses of action; and
  adding the action to the suggested course of action.

30. The apparatus of claim 13, wherein the program instructions further direct the processing system to:
  receive input indicating a change to an execution order associated with the suggested course of action; and
  update the suggested course of action based on the input.

* * * * *